May 2, 1967  R. G. HOLMAN  3,317,146
METHOD OF WINDING A REINFORCING CORD ON A HOLLOW SPHEROID
Filed Aug. 15, 1962  12 Sheets-Sheet 1

Rudolph G. Holman,
INVENTOR.

BY
ATTORNEY.

Rudolph G. Holman,
INVENTOR.

BY

ATTORNEY.

May 2, 1967  R. G. HOLMAN  3,317,146
METHOD OF WINDING A REINFORCING CORD ON A HOLLOW SPHEROID
Filed Aug. 15, 1962  12 Sheets-Sheet 3

Rudolph G. Holman,
INVENTOR.

BY
ATTORNEY.

INVENTOR.
RUDOLPH G. HOLMAN
BY
ATTORNEY.

INVENTOR.
Rudolph G. Holman
BY Nicholas T Volak
ATTORNEY.

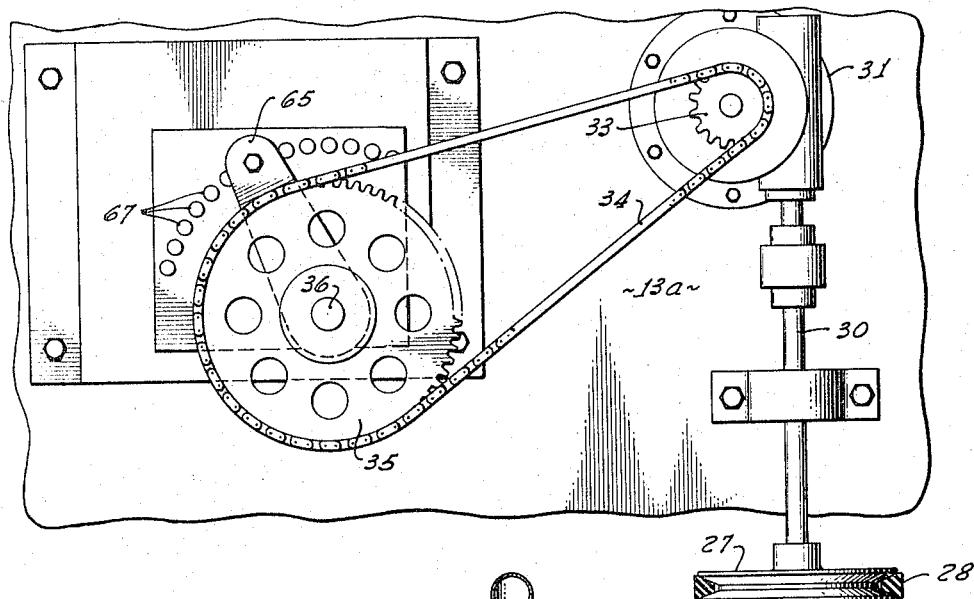
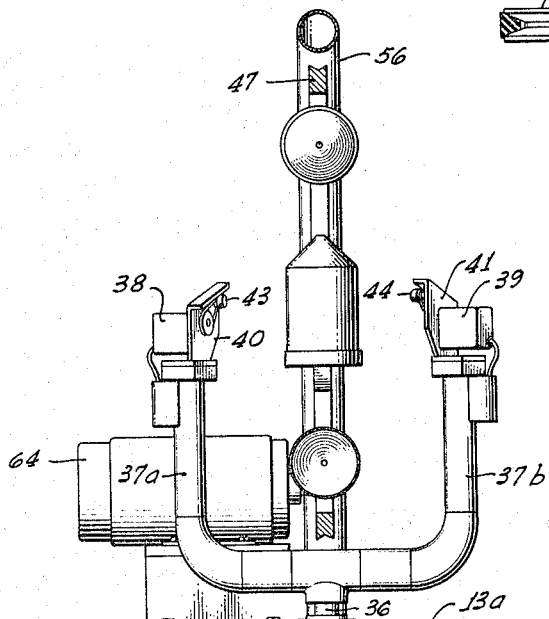
Fig. 21.
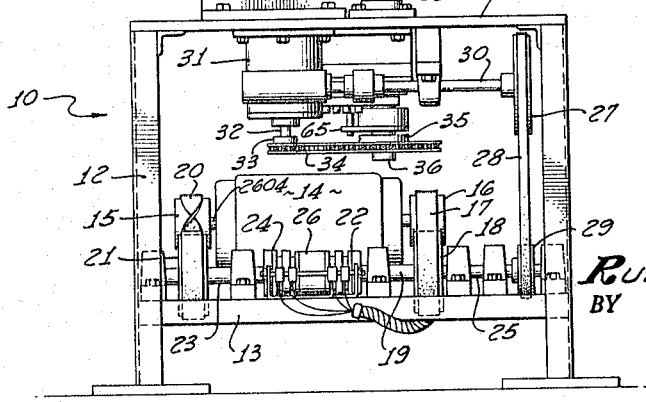
Fig. 20.
INVENTOR.
RUDOLPH G. HOLMAN
BY
Nicholas T Vohr
ATTORNEY.

May 2, 1967 R. G. HOLMAN 3,317,146
METHOD OF WINDING A REINFORCING CORD ON A HOLLOW SPHEROID
Filed Aug. 15, 1962 12 Sheets-Sheet 7

INVENTOR.
RUDOLPH G. HOLMAN
BY Nicholas T Volk
ATTORNEY.

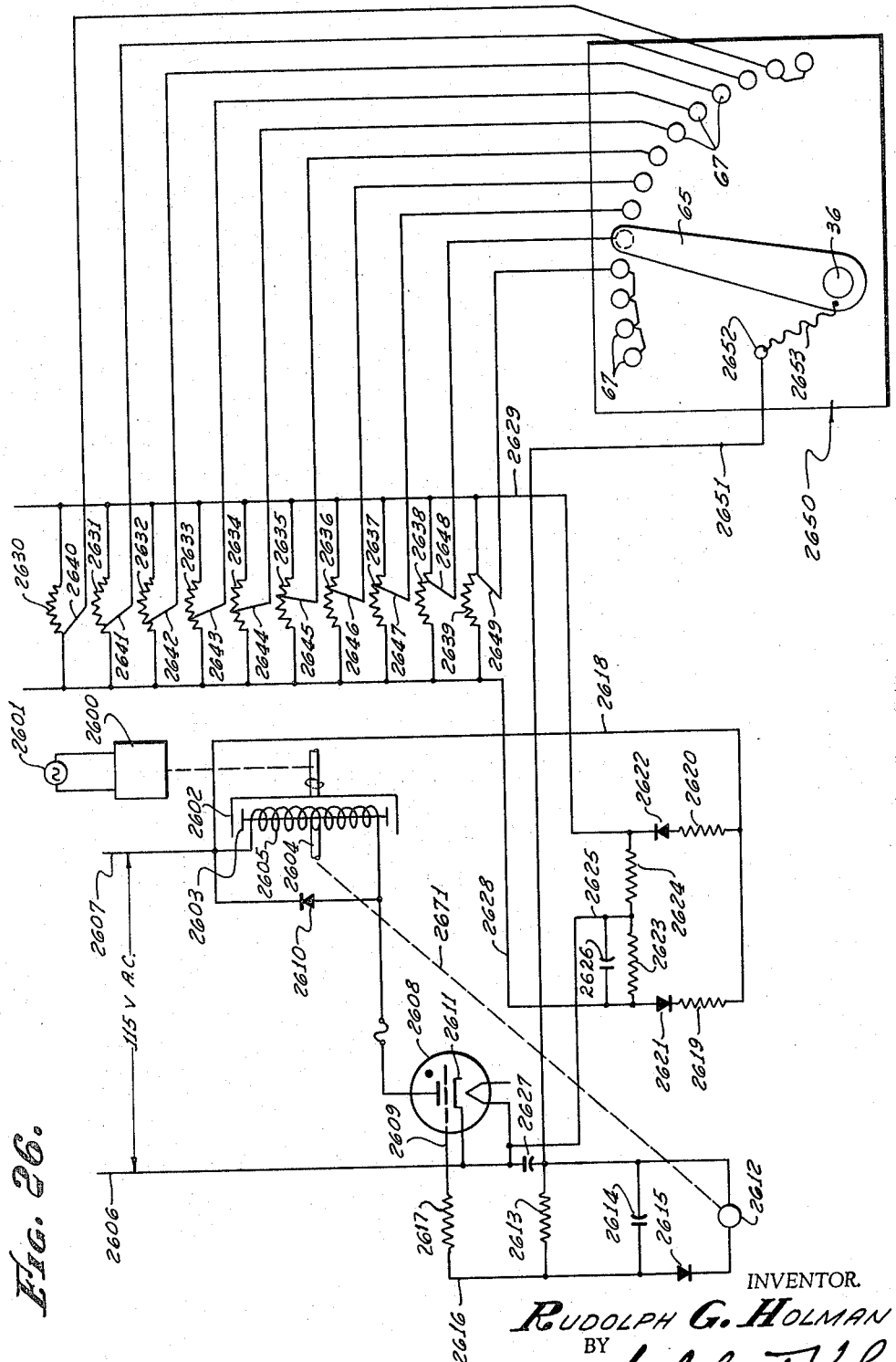

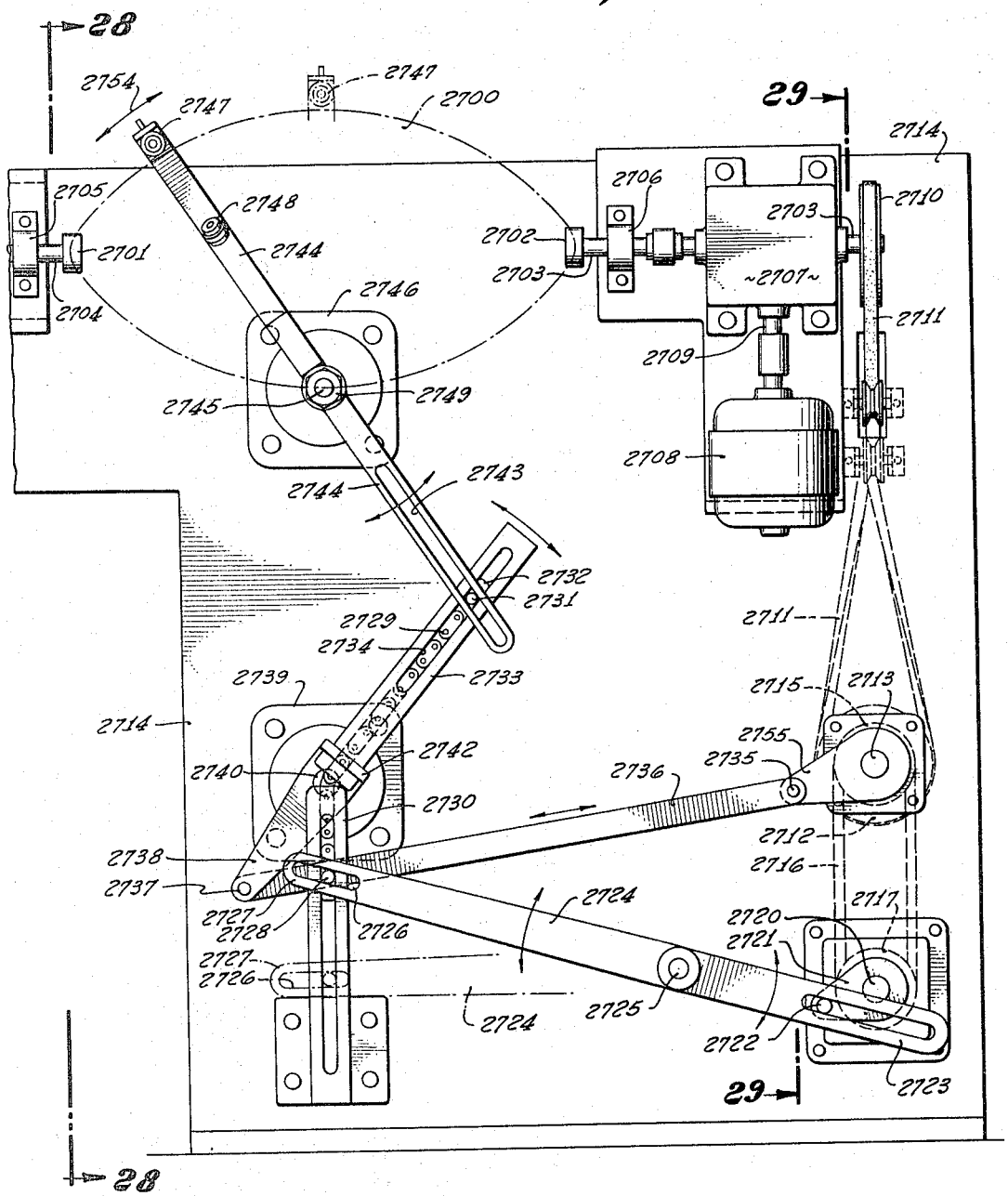

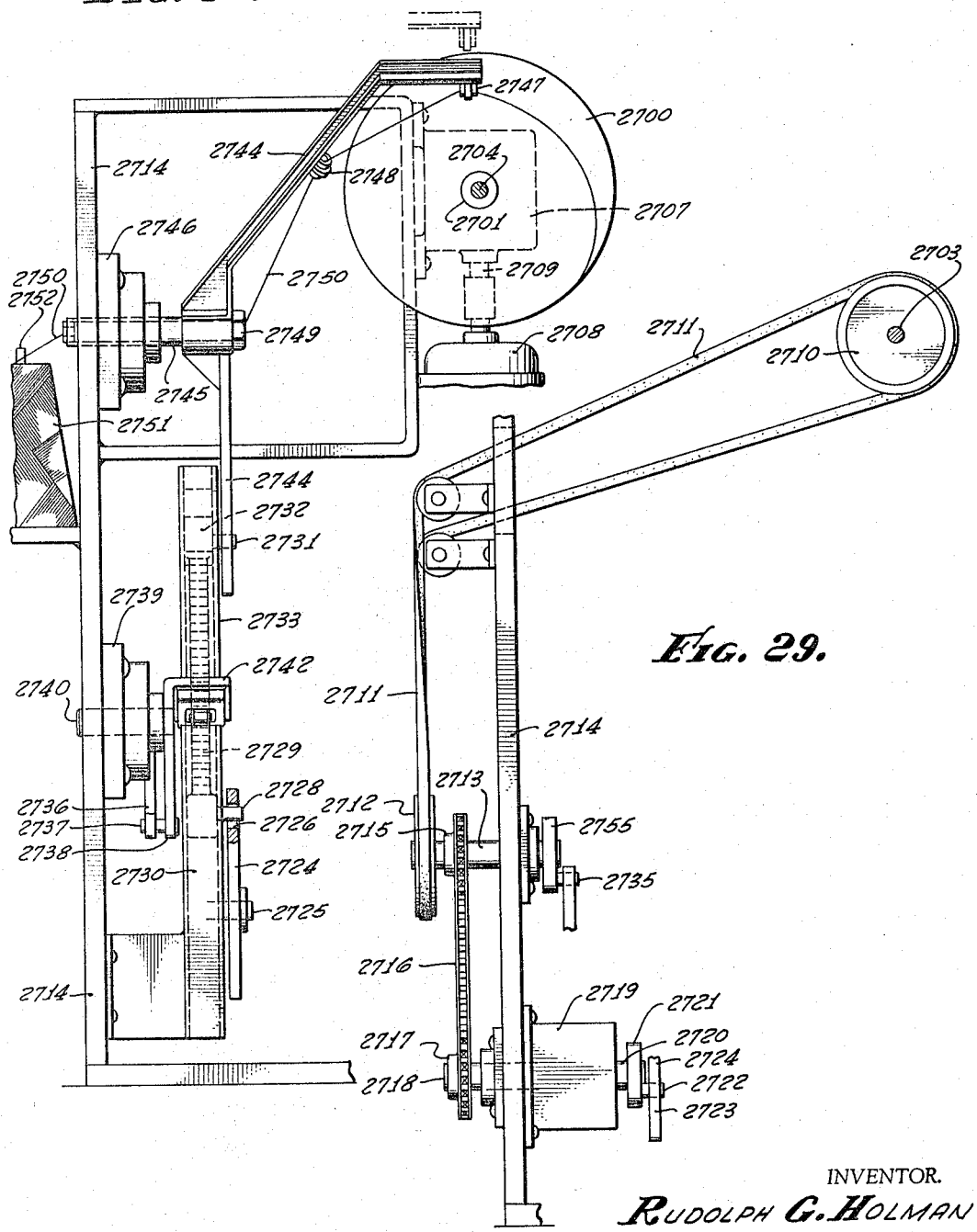

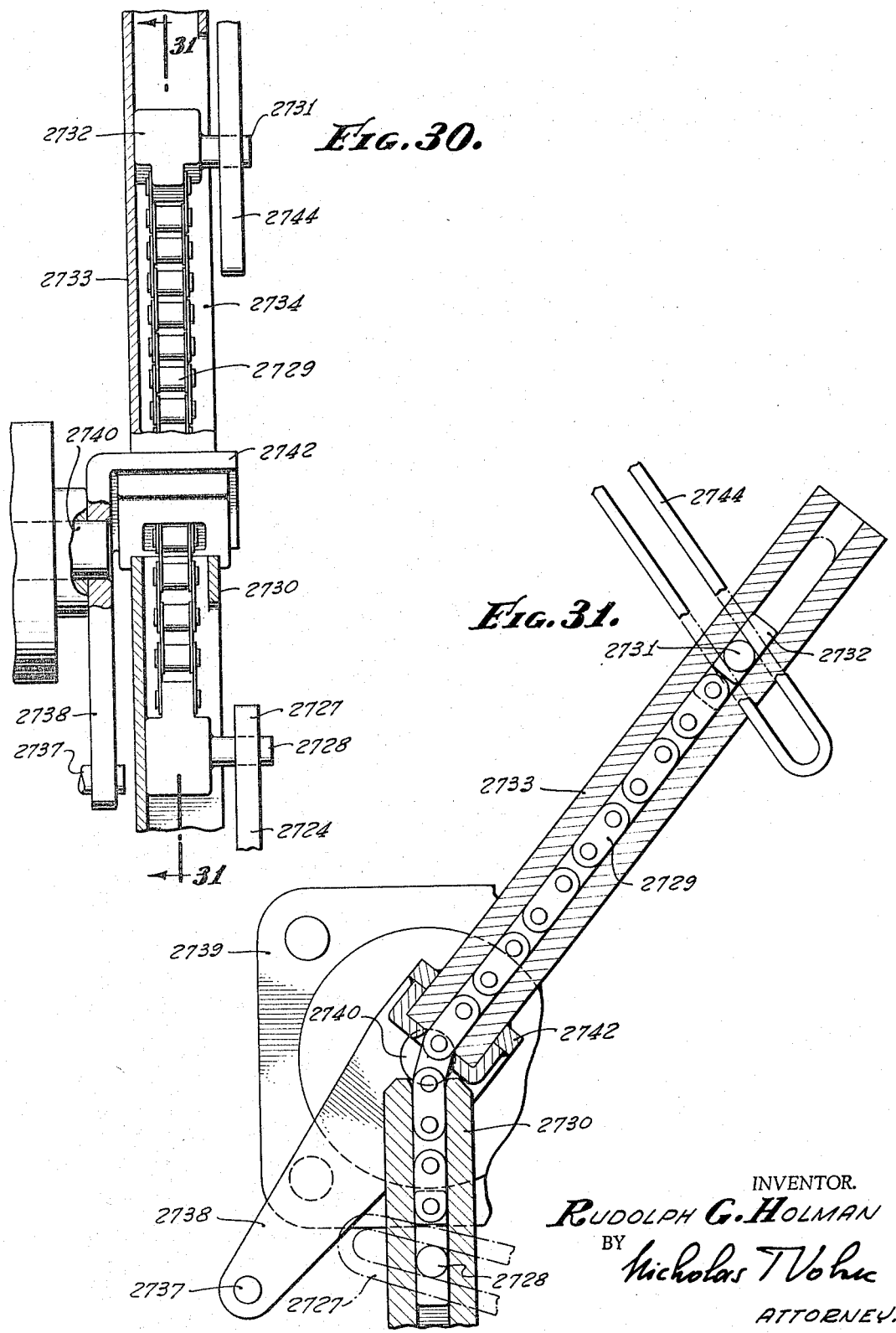

INVENTOR.
RUDOLPH G. HOLMAN
ATTORNEY.

3,317,146
METHOD OF WINDING A REINFORCING CORD
ON A HOLLOW SPHEROID
Rudolph G. Holman, Santa Ana, Calif., assignor to W. J.
Voit Rubber Corp., a corporation of California
Filed Aug. 15, 1962, Ser. No. 221,927
5 Claims. (Cl. 242—3)

This application is a continuation-in-part application of the parent application, Ser. No. 731,226, filed Apr. 28, 1958, entitled Cord Wound Football and the Like and Method of Manufacture Thereof, which was abandoned after filing this application.

The present invention relates to methods for winding a cord on hollow spheroids for reinforcing the wall of such spheroids against the pressure exerted by fluid contained within said spheroids.

The invention will be described by way of example in connection with sporting balls having the shape of spheroids generally known as footballs. In particular, it relates to a method for winding a reinforcing member in the form of a cord winding about a spheroidal bladder prior to an outer cover being placed thereover.

Footballs are approximately spheroidal in shape and may be considered as approaching ellipsoids. The configuration of a football is essentially a solid body formed by revolving a circular arc around its cord. The shape of such solid body is illustrated in the drawings and will be described more in detail later. Since no specific mathematical or geometric term appears applicable, the configuration will be referred to hereafter as a spheroid. Prior art footballs are usually formed with an internal flexible and inflatable bladder of elastomeric material which is covered or wrapped with one or more layers of reinforcing material which may be impregnated fabric or a layer of cord wound on the bladder and an outer cover which is bonded to the reinforcing layer. A valve for inflating the ball is provided and is secured to the bladder and extends through the reinforcing layer and the cover. Footballs of the prior art have previously been made by the application of a plurality of impregnated fabric sectors between bladder and cover, or by the wrapping of the cord helically around the bladder from end to end thereof. Such types of reinforcement have necessarily been nonuniform in one respect or another, since fabric layers require overlapping, and helically wound cord layers applied along the longitudinal axis of the ball result in a product which is reinforced only in a direction normal to the longitudinal axis. There is little or no reinforcement in the axial direction of the ball, and the ball possesses a non-uniform degree of reinforcement conforming to the curvature of the ball's surface. The balls heretofore produced by using a reinforcing winding have not proved to possess the optimum characteristics of strength, dimensional uniformity, stability and balance, which are desirable in a product requiring both accuracy and durability during use.

The novel method of applying a reinforcing cord is based upon the discovery that one or more reinforcing cords may be applied over the surface of a bladder in such a manner that the windings thereon correspond substantially to a family of geodesic curves.

The three most important definitions of geodesic curves, or lines, or geodesics consider them as (a) the shortest lines, (b) the frontal lines, and (c) the straightest lines. The first property means that every sufficiently small portion of a geodesic curve is the shortest path on the surface connecting the end points of the portion.

One, and only one, geodesic arc can be drawn through any two points of a curved surface if they are not too far apart. The geodesic arc may be obtained by pulling taut a thread that passes through the two points on the surface. On the outer convex surface of an ellipsoid or spheroid, the thread will follow a geodesic path if it is subjected to a certain tension and simultaneously is placed in proper position on the surface of the spheroid.

The second definition of geodesic lines—that they are frontal—means that they always move an infinitesimal arc of the surface straight ahead.

The third definition of geodesic as the straightest lines means that at each of its points the geodesic lines have the smallest curvature among all the curves through the point that lies on the curved surface.

Applicant has discovered that by winding a cord reinforcement about the bladder of a football in such a manner that the windings conform substantially to the geodesic lines about the surface of the bladder, the winding may be carried out without slippage and without the necessity of anchoring the thread due to the fact that the windings very closely follow the paths of geodesic lines. Since the resultant curves are of shorter length, the windings are uniform in tension and are also uniform in their reinforcing capacity over the entire surface of the ball. With some additional modification described later, this results in a product in which the internal radial stresses are uniformly contained by the winding, and the resulting ball possesses uniformity distributed resilience, strength and durability.

In essence, the winding is carried out in such a manner that the path of the reinforcement describes a family of substantially geodesic curves. Each winding cycle, producing a single complete turn, traverses substantially eight quadrants, or twice around the surface of the ball, and forms a double figure eight which bends over the equator of the ball. However, in order to obtain that distribution of turns over the surface of the spheroid which produces uniform resistance to stress, the pattern is continuously varied during the winding by a small predetermined angle so that while each cycle conforms substantially to the geodesic curve, each successive cycle starts at a different angle. In one example, this angle has the limits of from about 10° to 80° with respect to the equator. The distribution of the winding over the surface depends upon the rate of variation of the above angle which may be determined empirically. This type of path is not a true geodesic curve, but a very close approximation of the geodesic curve. Such approximation produces that type of coverage of the bladder's surface which adjusts the distribution of turns to the distribution of stresses over the surface of the spheroid, which is not uniform because of the asymmetry of the spheroid. The resulting distribution is better than the distribution obtainable with the ideal geodesic curves. These approximations will be referred to hereinafter, including the claims, as "substantially geodesic curves."

It is, therefore, an object of this invention to provide a method for winding reinforcing cord on a prolate spheroid, the wound cord approximating the path of a classical geodesic curve.

It is also an object of this invention to produce a reinforcing winding for a prolate spheroid composed of a series of turns of a cord following a substantially geodesic path.

An additional object of this invention is to provide the above type of method which also produces a winding having that distribution of turns over the surface of the spheroid which corresponds to the distribution of stresses over the surface of the spheroid when the spheroid is subjected to a pressure exerted on the wall of the spheroid by a fluid under pressure within the spheroid.

The novel features which are believed to be characteristic of this invention, both as to its organization and methods of operation, together with further objects and advantages thereof, will be better understood from the following description when read in conjunction with the accompanying drawings. It is to be understood, however, that the drawings are for the purpose of illustration only and are not intended as a definition of the limits of the invention.

Referring to the drawings:

FIGURES 1a to 7, inclusive, illustrate diagrammatically the theory of the proposed winding pattern around a spheroid;

FIGURES 8a to 11, inclusive, illustrate diagrammatically the winding of a complete cycle of a geodesic curve about a spheroid;

FIGURE 20 is an end view of the machine, taken along line 20—20, shown in FIGURE 19 with the rotatable ring of the machine being shown in cross-section;

FIGURE 21 is a view taken in the direction of arrows 21—21, FIGURE 19, of a mechanism for varying the speed of a motor used for oscillating the supporting element of the machine;

FIGURE 26 is a schematic diagram of the circuit used for obtaining a variable speed operation of a motor used in the machine of FIGURES 18–25;

FIGURE 27 is a plan view of a machine of the type diagrammatically disclosed in FIG. 12;

FIGURE 28 is a side view of the machine of FIGURE 27;

FIGURE 29 is an enlarged side view, taken along line 29—29, FIGURE 27, to illustrate the drive mechanism;

FIGURE 30 is an enlarged side view, and FIGURE 31 is an enlarged plan view, partly in section, of the chain mechanism used in the machine of FIGURES 12 and 27–31.

Figure 1A:
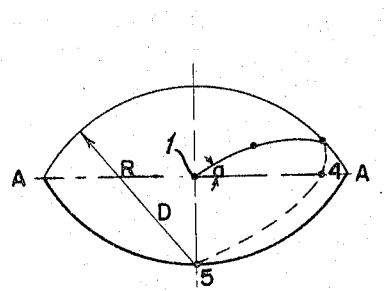
Figure 1B:
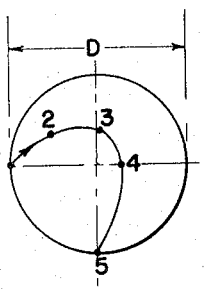
Figure 1C:
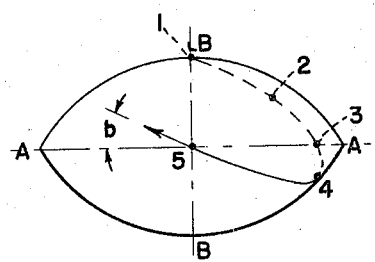
Figure 9A:
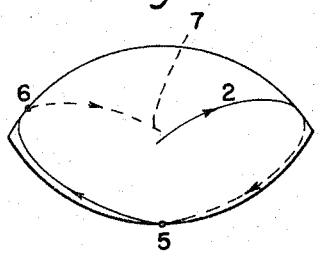
Figure 9B:
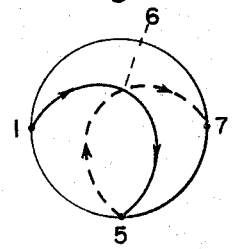
Figure 10A:
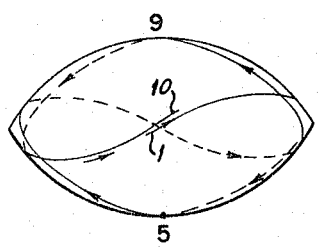
Figure 10B:
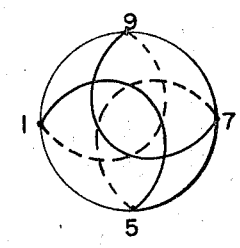
Figure 11:
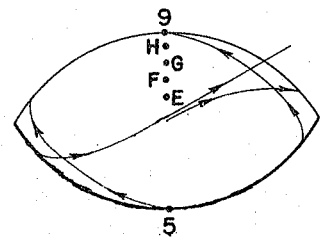

Referring to FIGS. 1a to 7, inclusive, of the drawings, an inflated football bladder is mounted for rotation along its longitudinal and major axis A—A and the cord winding is started at point 1 at an angle $\alpha$ of, say, thirty degrees from the longitudinal axis A—A. The end of the thread or cord may be taped at the starting point to hold it to the bladder. In order to conform substantially to a geodesic curve and to satisfy the requirement that the thread does not slip off in either direction on the surface of the ball, the path of the wind must be such that every increment of length is a continuation of its preceding length when viewed perpendicular to the surface of the point common to the increments. Such a trace is shown in FIGURES 1a–1c for a bladder having a contour such that the radius R equals the minor diameter D. The shape of the bladder only approaches an ellipsoid and, for this reason, it is called a spheroid. Starting at point 1, the trace passes through two quadrants of the ball and through points 2, 3, 4 and 5 into the third quadrant of the ball, nearly ¾ turn around the ball, wherein angle $b$ (see FIG. 1–C) is equal to angle $\alpha$. The trace then continues on through the third and fourth quadrants of the ball, as illustrated in FIG. 9a, reaching a point opposite point 1, and then continues again around the ball through the four quadrants to return to a point 10, FIG. 10a, adjacent to, but not overlapping, the starting point 1, as described further below.

Figure 2:
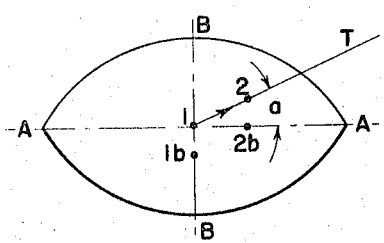
Figure 3:
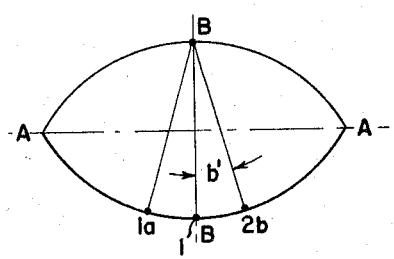
Figure 4:
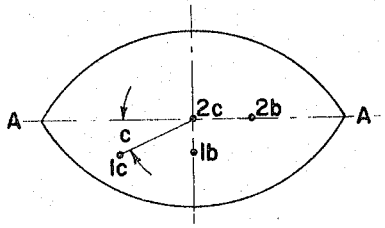
Figure 7:
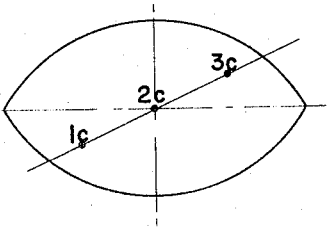
Figure 5:
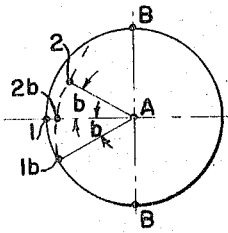
Figure 6:
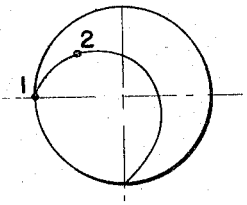

To develop the trace geometrically, point 2 may be selected in FIG. 2 on the straight line T. The ball is then rotated on its axis A—A to point 2b, at the same time the ball is rotated about axis B—B, as shown in FIG. 3, about the angle $b'$ so that point 2b moves to point 1 to become 2c, illustrated in FIG. 4. FIG. 4 is a front elevation of point 2c viewed perpendicular to the surface at that point. Point 1c is also shown in FIG. 4 in its true position, representing the movement of point 1 to its new position. Angle $c$ in FIG. 4 corresponds substantially to angle $\alpha$ in FIG. 2. To find the true position of point 2 as in FIG. 1, reverse the operations. FIG. 5, therefore, shows an end view with the positions of points 2b and 1b corresponding to the position shown in FIG. 3. As point 1b, FIG. 2, moves to point 1 through angle $b$, point 2b moves to point 2 through the same angle $b$. FIG. 6 shows an end view of line L with the true increment line 1–2. To find the next point 3, rotate the ball as shown in FIG. 4 so that point 2c is viewed perpendicular to the surface. Point 3, therefore, must be in line with line 1c–2c, as shown in FIG. 7. The distance 2c to 3c is arbitrary, but should be selected as short as possible. If the ball is again rotated to return point 1c to its original position 1, as shown in FIG. 1, point 2 assumes the same position obtained in the last operation and point 3 becomes the terminal of the last increment.

This operation of alternately rotating the ball so that the last point is viewed head-on and selecting the next point on the extension of each last line develops a reasonably close approximation of, but not the exact path, or trace, of the theoretical, or classical, geodesic curve. If the thread is wound on the ball starting at point 1 in the direction of line L and is applied to the surface of the ball over the trace of this curve, the thread will not slip either to the left or to the right, but will remain on the ball since the resultant component of the tension of the thread, no matter how low, is always perpendicular to the surface. There will be a new and different curve for every angle $\alpha$, but the same principle remains unchanged.

Figure 8A:
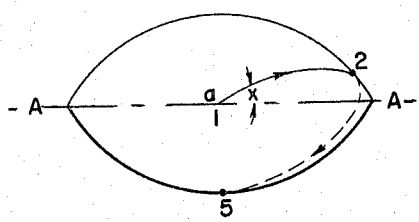
Figure 8B:
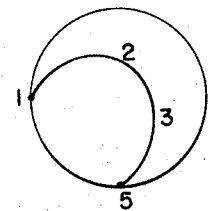

FIGURES 8a to 11, inclusive, illustrate the application of a winding for one complete winding cycle. FIG. 8a illustrates the curve utilizing an angle $x$ of approximately 25 degrees for purposes of illustration. As the thread is applied from point 1a to point 5 in FIG. 1a for a small angle $x$, in FIG. 8a, the point traverses nearly three quadrants. This condition is quite significant when the winding operation is mechanized so that angle "$\alpha$" or "$x$" is made to change by a constant increment $d\alpha/dt$. FIGURES 8a and 8b illustrate one-fourth of a complete winding cycle of a ball. FIGURES 9a and 9b show one-half of a complete cycle. As the winding continues from point 7 in FIGS. 9a and 9b for the second half of the cycle, the trace ends adjacent to the original point 1, as shown in FIGS. 10a and 10b, and further winding will continue at the initial angle $x$ but intersecting the equator of the ball at incrementally displaced points, such as point 10. It should be noted that at points 1 and 7 the wind is at positive angles $x$, but at points 5 and 9 the angles are negative $x$. As the winding pattern continues through successive points on the equator as shown at E, F, G, H, etc., in FIG. 11, until point 9 is reached, the winds become crisscrossed, preventing slippage of the thread and adding two dimensional strength to the wind. It may also be noted that one complete winding cycle is considered to be that which returns the cord or thread to a point (point 10 in FIG. 10a) adjacent to the starting point (point 1) on the surface of the ball for each previous wind. Stated differently, one cycle is represented by that portion of the curve included within adjacent passages through the equatorial plane in the same direction. This cycle produces three complete revolutions of the cord around the surface of the ball.

Figure 12:
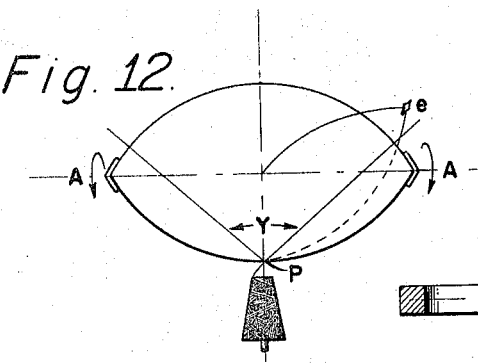
FIGURE 12 illustrates diagrammatically one method for producing the proposed winding.

There are various methods for applying the thread to the ball substantially to satisfy the principles described above. The thread may be applied manually as long as the ball may be rotated in the proper manner. In order to perform the operation mechanically, one method of doing this is illustrated in FIG. 12. The ball is held in position by means of cups which impart rotation about the major axis A—A, an eyelet e is pivoted at P and thread from the spool passes through P then through e onto the ball. The eyelet is made to oscillate through the maximum angle y in a manner so as to wind the thread along the trace previously described as the ball is being rotated. The angle y is constantly but gradually varied from the maximum, as shown, to zero. At zero, the eyelet does not oscillate and the winds merely become circumferential.

The eyelet is made to oscillate or move back and forth through a predetermined angle Y, which at its maximum of, say, about 112°, provides complete coverage of the ball from areas adjacent one pole to the other, but excluding the very tips of the ball with a family or group of identical, spaced curves, approaching the geodesic curves. As the angle through which the eyelet oscillates becomes less and less, the reinforcement is formed progressively toward the center portion of the ball through the application of successive families of substantially geodesic curves, and when the angle becomes zero, or when the eyelet ceases to oscillate, the windings become equatorial.

Figure 13:
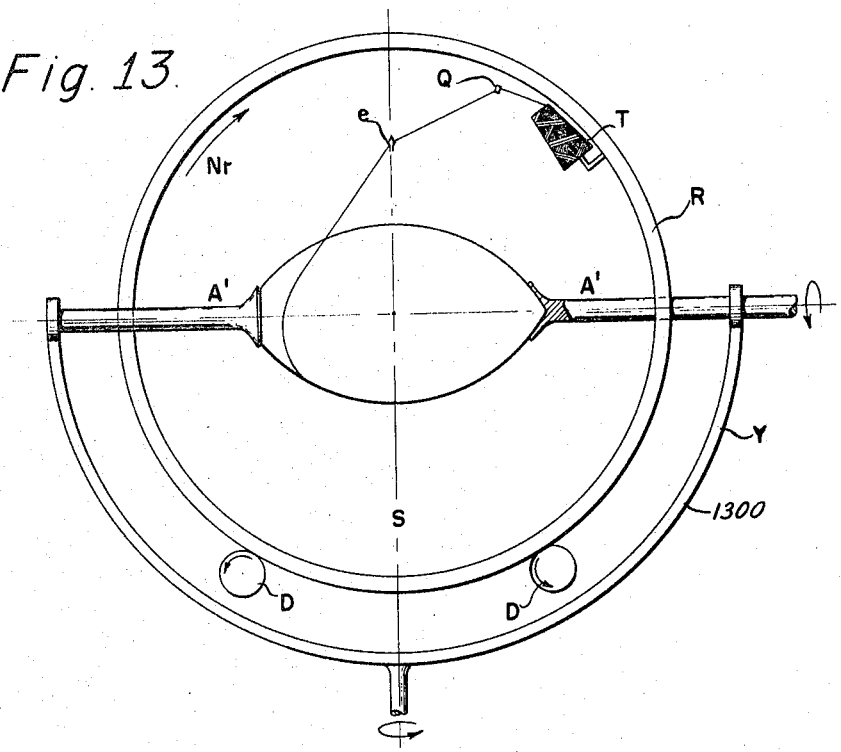
FIGURES 13 to 15 illustrate diagrammatically another method for producing the proposed winding.

Another method of winding the ball is shown in FIG. 13. In this modification the ball is supported at its longitudinal axis by cups at A'—A' which rotate the ball at a uniform angular velocity $W_1$ around its major axis A'—A'. These cups are supported on a yoke 1300 which is oscillated through an angle less than 90° at a variable angular velocity but constant amplitude about the minor axis S of the football. A ring R, supported and rotated by drive wheels D—D, carries a spool of thread T and an eyelet e. If the ring is rotated at a uniform angular velocity $W_2$ which is equal to:

$$W_2 = 2W_1 \qquad (1)$$

where $W_1$ is the constant angular velocity of rotation of football around its major axis;
$W_2$ is the constant angular velocity of rotation of ring R around the center of the football;

the winding pattern so closely follows the theoretical geodesic pattern that extremely fine slippery thread of 100/2 nylon has been successfully applied to balls without the use of any adhesives and with very little tension. The position of the yoke controls the winding angle α of FIG. 1. In order to produce the type of dispersion illustrated in FIG. 16, the angular ring velocity $W_2$ is made slightly higher than $2W_1$, i.e., slightly more than twice the angular major axis velocity $W_1$; for example, if $W_1$ is 90 r.p.m., then $W_2$ is in the order of 192 r.p.m., or 1:2.13 ratio.

Figure 16:
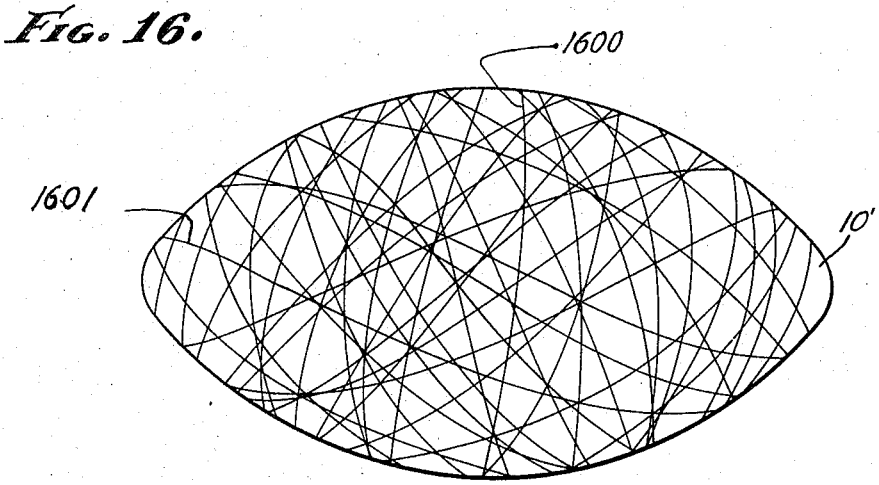
FIGURE 16 is a side view of a football with several turns of a single cord wound on the surface of the bladder.
Figure 17:
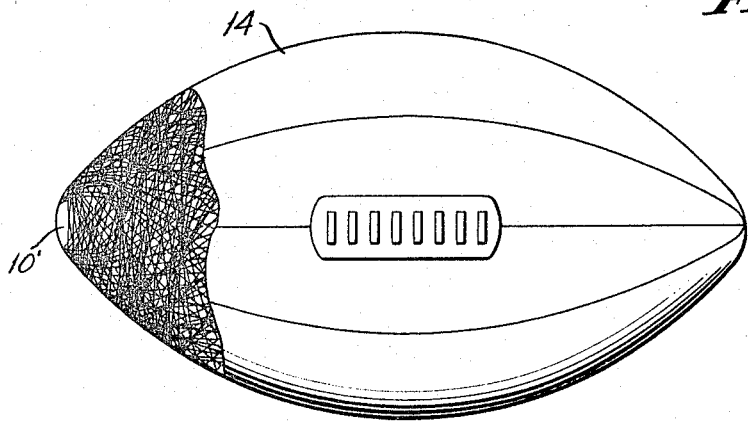
FIGURE 17 is a side view of a completed football with the cover removed at one end in order to illustrate the type of winding produced by the method of this invention.

If the yoke remains in one position, a single winding pattern is applied over the surface of the ball. In order to obtain a differential series of windings from the poles toward the center or equator of the ball, the yoke moves incrementally at a variable angular velocity, and hence, at a non-uniform rate from an angle, say, of about 10° to about 80° with respect to the ring R. At 0° the thread would be wound directly over the poles as well as the cups holding the ball, and at 90° the thread would be wound along the equator of the football. In actual practice, neither equator turns nor the turns passing through the poles are applied to the ball. As shown in FIG. 16, two groups of families 1600 and 1601 of geodesic curves are illustrated to show the manner in which a bladder is reinforced. In FIG. 16, bladder 10' has applied thereto a group of windings applied at a given angle with respect to the longitudinal axis of the ball, each curve being incrementally spaced from the other and applied so as to reinforce the midsection of the bladder.

A completed ball is illustrated in FIG. 16 wherein a bladder covered with a series of groups of geodesic curves is enclosed within a conventional cover 14. Such a cover may be constructed and applied in the manner described, for example, in U.S. Patent No. 2,653,818, and others. The bladder is not covered at the poles since complete coverage at these areas is difficult to accomplish and is not necessary.

Figure 14:
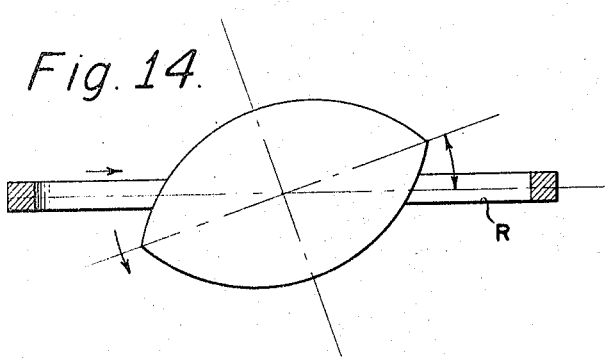
Figure 15:
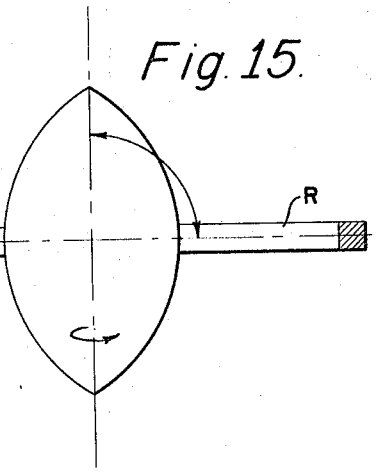

A more detailed and complete version of the machine, diagrammatically illustrated in FIGS. 13, 14 and 15, is illustrated in FIGS. 18 through 26.

Figure 22:
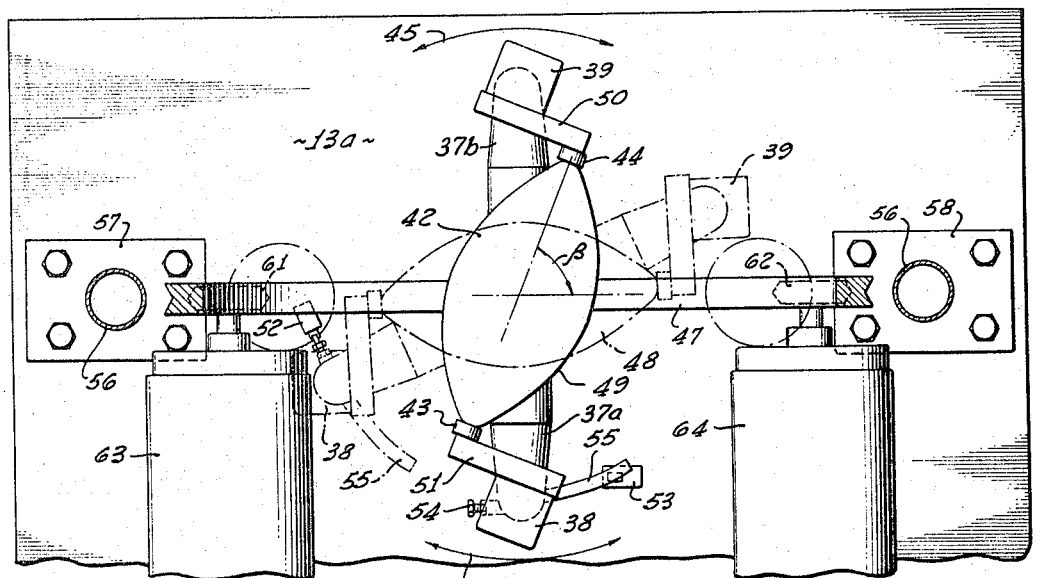
FIGURE 22 is a plan view of a football supporting yoke in two extreme angular positions.

Referring to FIGURES 18–26, the machine is mounted on a table, or frame, 10A having vertical legs 11 and 12, a lower shelf 13 and a table top 13a. The lower shelf 13 supports a variable speed motor 14 which is connected to pulleys 15 and 16 at opposite ends of the drive shaft of the variable speed motor 14. A directly connected belt 17 interconnects pulleys 16 and 18. Pulley 18 drives a hollow shaft 19 connected to a right electric clutch 22, illustrated in FIG. 20. A crossed belt 20 interconnects pulley 15 and pulley 21 which rotates a left shaft 23 in the opposite direction to the direction of rotation of shaft 19. The inner end of shaft 23 is connected to a second electric clutch 24. A countershaft 25 is connected to the central element 26 of the electric clutch, and depending upon the energization of the left clutch 24 or right clutch 22, shaft 25 is rotated first in one direction and then in the opposite direction by pulleys 16 and 15 and belts 17 and 20. Shaft 25 is connected to a pulley 27 through a belt 28 and a pulley 29 mounted on shaft 25. Therefore, a countershaft 30 may be rotated first in one direction and then in the opposite direction by the variable speed motor 14. Shaft 30 is connected to a gear box 31 which is provided with a countershaft 32 and a sprocket wheel 33 mounted on countershaft 32, and a sprocket chain 34 which is connected to a sprocket wheel 35 mounted on a vertical shaft 36. Vertical shaft 36 terminates in fork members 37a and 37b. The fork members 37a and 37b are provided with synchronous motors 38 and 39 respectively and brackets 40 and 41 respectively for supporting a football bladder 42 with the aid of cups 43 and 44 in the manner illustrated in FIG. 22. Cups 43 and 44 are provided with recesses for accommodating the conical ends of bladder 42 in the manner also illustrated in FIG. 22. In operation, the variable speed motor 14 and the associated drives oscillate shaft 36 and its fork 37a–37b back and forth in the manner illustrated by arrows 45 and 46 illustrated in FIG. 22. FIG. 22 also illustrates the two extreme positions that may be occupied by bladder 42. Fork 37b is almost in the plane of a ring 47, which corresponds to ring R in FIGS. 13, 14 and 15. In position 48 the longitudinal axis of the football bladder is almost in the plane of ring 47, while in position 49 it is almost in the plane perpendicular to the plane of ring 47. Position 48 of the bladder corresponds to that position illustrated in FIG. 14, except that angle α in FIG. 14 is larger than the one illustrated in FIG. 22. This is due to the fact that the football holding arms and brackets 40 and 41 are provided with offset arms 50 and 51 which enable one to place the longitudinal axis of the football bladder 42 almost entirely into the plane of ring 47. It will thus be apparent by virtue of this arrangement, that the equatorial plane at the equator of bladder 42, i.e., the line of intersection of the outer surface of the bladder with a plane perpendicular to the longitudinal axis of the bladder at its center, never quite becomes perpendicular with the plane of rotation of ring 47 and never quite lies in the plane of rotation of ring 47. Hence, during each complete rotation or ring 47 eyelet 2500 (FIG. 25) crosses the equatorial plane. It will thus be appreciated that eyelet 2500 oscillates on each side of this equatorial plane and the equator, and hence, can be aptly termed to oscillate relative to the equator of football bladder 42. Thus, even though the eyelet also revolves about football bladder 42, it is clear that the eyelet oscillates from one side of the equator of the football to the other side of the equator. Position 49 of the same bladder in FIG. 22 corresponds to the position illustrated in FIG. 15, except that in FIG. 15 angle $\beta$ is only slightly less than 90°, while the same angle $\beta$ in FIG. 22 is smaller than that illustrated in FIG. 15. This is again due to the fact that the bifurcated member 37a–37b and brackets 40 and 41 are provided with the offset members 50 and 51. From FIG. 20 it follows that the bifurcated members 37a, 37b, cannot be positioned directly into the plane of ring 47 because the lower portion of ring 47 lies between the bifurcated members 37a and 37b, and, therefore, rotation of this bifurcated member eventually will result in the striking of the lower portion of ring 47 by both members 37a and 37b. Therefore, rotation of the bifurcated member beyond this extreme position is prevented by ring 47.

Figure 18:
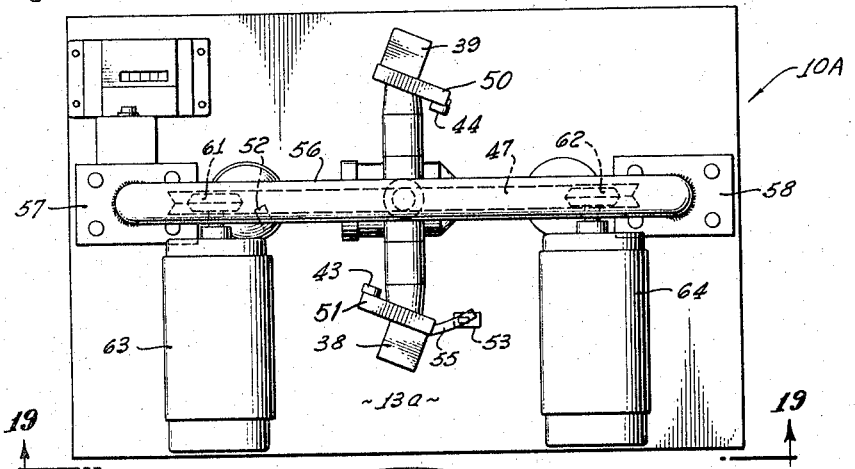
FIGURE 18 is a plan view of the machine of the type disclosed diagrammatically in FIG. 13.
Figure 23:
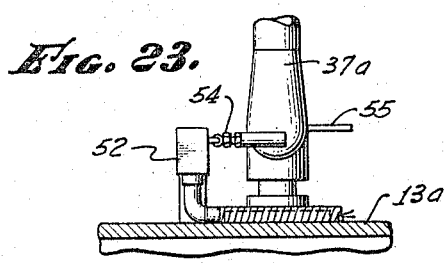
FIGURES 23 and 24 are side views of two limit switches used for actuating electric clutches.
Figure 24:
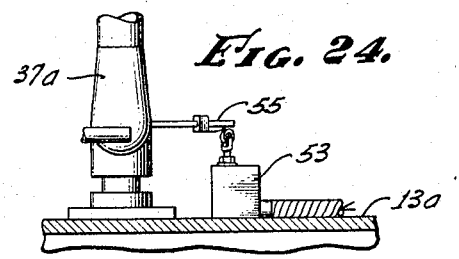
Figure 25:
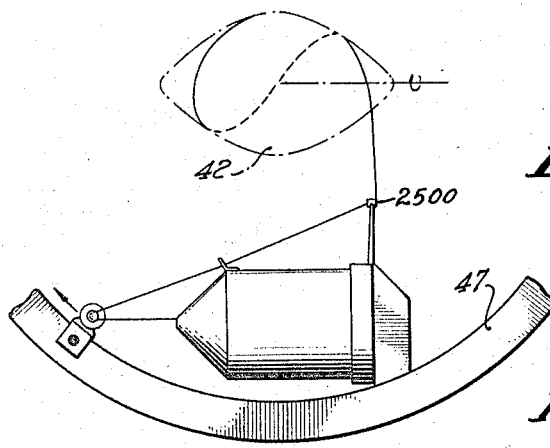
FIGURE 25 is a side view of a bobbin supplying the cord to be wound on the bladder mounted on a rotatable ring of the machine illustrated in FIGURES 13 and 18 through 25.
Figure 32:
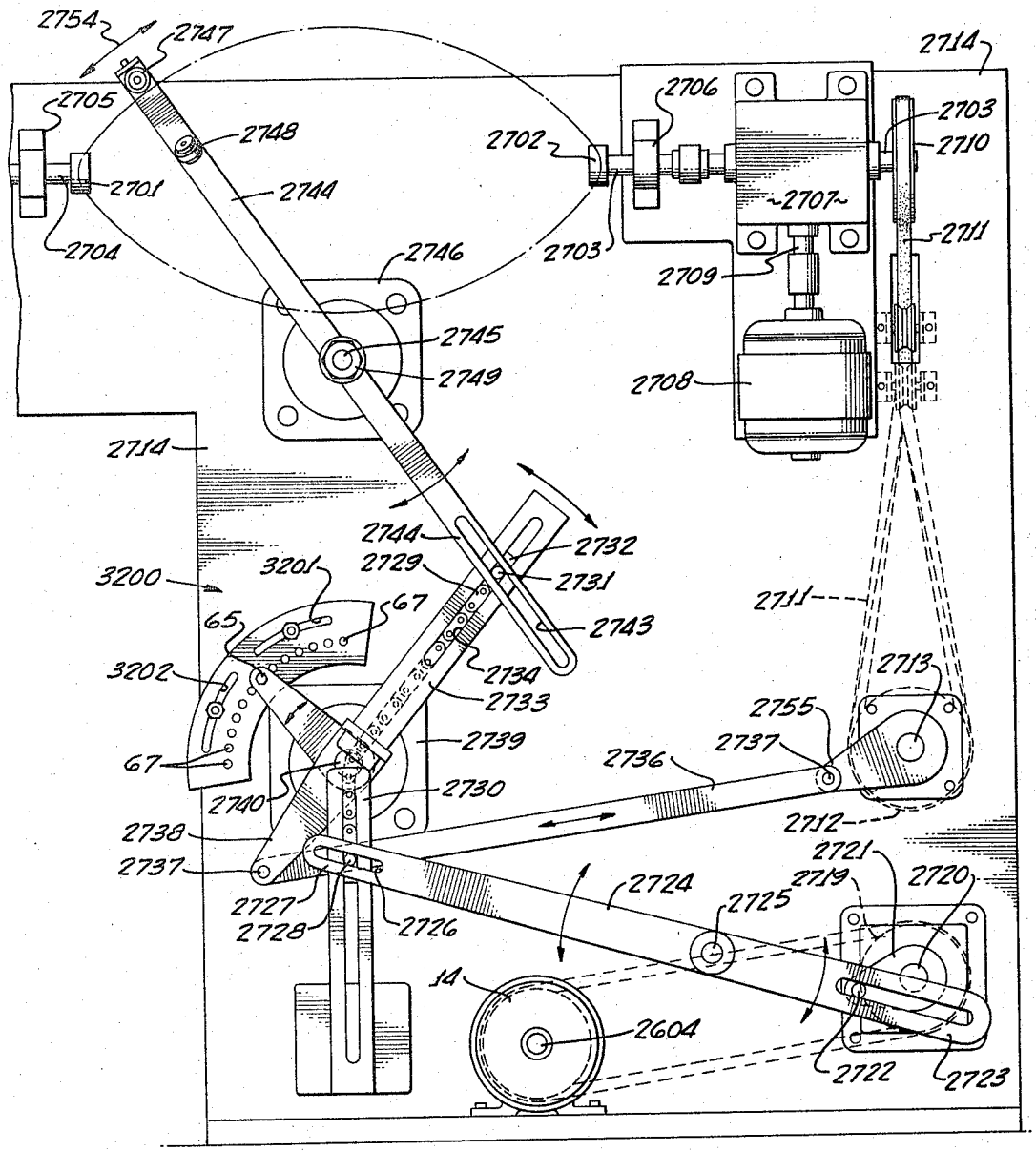
FIGURE 32 is a plan view of the machine diagrammatically disclosed in FIGURE 12, but having two independent drives, one motor for rotating the ball and oscillating the arm, and a second motor for varying the amplitude of the arm.

The limitations of the amplitude of the bifurcated member are controlled by two limit switches 52 and 53 illustrated on an enlarged scale in FIGS. 23 and 24, and also in FIGS. 22 and 18, which are actuated by means of the actuating arms 54 and 55 mounted on arm 37a of bifurcated member 37a–37b. As will be explained more in detail later, actuation of the limit switches 52 and 53 energizes the corresponding electric clutch 22 or 24 and deenergizes the other clutch 22 or 24. This reverses the direction of rotation of shaft 36 and of the bifurcated member, with the result that this member reverses its rotation before it touches ring 47.

Ring 47 is mounted in the plane of a hollow, bent tube 56, which is attached to table top 13a by means of flanges 57 and 58. This hollow, bent tube, having a circular upper portion, is provided with two rollers 59 and 60, see FIG. 19, which engage the V-shaped outer periphery of ring 47 and in this manner support this ring in one fixed vertical plane. The lower part of the ring is supported by two drive rollers 61 and 62 which are provided with V-shaped peripheries fitting into the concave inverted V-shaped periphery of ring 47. In this manner ring 47 is thus supported by four V-shaped rollers, rollers 59 and 60 being idler rollers while 61 and 62 are drive rollers. These drive rollers 61 and 62 are connected to synchronous motors 63 and 64 respectively which rotate ring 47 at a constant angular velocity.

Referring now to FIG. 21, sprocket wheel 33 and chain 34 oscillate back and forth the sprocket wheel 35, which is connected to shaft 36, and thus oscillates shaft 36 in the manner described previously in connection with the description of FIG. 22. Shaft 36 is also provided with an oscillating arm 65 which connects different resistors in the control circuit of the variable speed motor 14 with the aid of a plurality of contacts 67.

The control circuit of the variable speed motor 14 is illustrated in FIG. 26. For a more detailed description of the circuits and nature of motor 14, reference is made to the U.S. Patent No. 2,659,832 to R. L. Jaeschke, and additional patents cited therein. Motor 14 consists of an induction motor and a variable slippage clutch. The variable slippage clutch may comprise an eddy current motor including an eddy current drum driven by the induction motor, a multipole spider which drives the output shaft and furnishes useful power, and a stationary field coil. The eddy current drum runs at a substantially constant speed of the induction motor which drives it, while the speed of the multipole spider is a function of the magnitude of the direct current impressed on the stationary field winding, which produces north and south poles in the multipole spider magnetically surrounding the field winding. The eddy currents induced in the drum by the spider produce a torque in the spider which rotates the shaft 2604. This is the shaft supporting pulleys 15 and 16 in FIG. 20. The amount of torque, and, therefore, the speed, transmitted to pulleys 15 and 16 is proportional to the D.C. excitation furnished to the stationary field coil since this current induces either stronger or weaker poles in the spider and thus either decreases or increases the slippage between the spider and the drum. The control circuit disclosed in FIG. 26 controls the magnitude of the field current supplied to the field coil. In order to monitor the speed of motor 14, motor 14 is also provided with a tachometer generator and its voltage is used to compare it with, or oppose, a reference voltage, the two voltages controlling the current supplied to the field coil. The speed of the eddy current motor is controlled by continuously changing the resistance of the field coil circuit by means of the commutator 65–67 and sprocket drive 35–34–33, which is driven by the eddy current motor 14. Therefore, motor 14 is self-regulating.

Referring to FIG. 26, the induction motor 2600 is connected to a source of alternating current potential 2601 and it drives a substantially constant speed eddy current drum 2602. The multipole spider is diagrammatically illustrated at 2603, and it is in the inductively coupled relationship with respect to drum 2602. Spider 2603 is connected to a shaft 2604 and it is this shaft 2604 that supports pulleys 15 and 16 and rotates these pulleys. Within the multipole spider 2603, but spaced from it and supported by the stationary frame of the motor assembly, there is mounted a stationary field coil 2605. The coil is connected to a source of alternating current through conductors 2606 and 2607 through a cathode-anode circuit of a gas-filled thyratron 2608 having a control grid 2609. The field coil 2605 is shunted by means of a diode 2610. This diode shunts any transients that may appear across the coil and also short-circuits the coil against any high potentials which may be induced because of collapse of the magnetic field through the coil upon its disconnecting from the source of potential by thyratron 2608. The control circuit connected to grid 2609 and cathode 2611 includes a tachometer generator 2612 which is connected across a grid resistor 2613. Also connected across resistor 2613 is a filtering condenser 2614 and a rectifier 2615 for rectifying the output of tachometer 2612. Tachometer 2612 is an alternating current generator mounted within the motor assembly 14 and mechanically connected to and driven by shaft 2604, as indicated by a dotted line 2671. Resistor 2613 is connected directly across tachometer generator 2612. Conductor 2616 and an integrating capacitor 2627 connect resistor 2613 across the grid-cathode circuit of thyratron 2608 through capacitor 2627. Conductor 2616 is connected to control grid 2609 of thyratron 2608 through a resistor 2617. The second circuit, which is also connected across the cathode-control grid circuit of thyratron 2608, is as follows: conductor 2618 is connected to resistors 2619 and 2620, rectifiers 2621 and 2622, resistors 2623 and 2624, which are connected across rectifiers 2621 and 2622, and a conductor 2625 connected to conductor 2606, and, therefore, cathode 2611. A filtering capacitor 2626 is connected across resistor 2623. The following circuit is connected across resistors 2623 and 2624: conductor 2628, conductor 2629 and potentiometers 2630 through 2639. The potentiometer arms 2640 through 2649 are connected to the respective elements 67 of a commutator 2650 having its contact arm 65 mounted on shaft 36 and connected to an outgoing conductor 2651 through a terminal post 2652 and a jumper wire 2653. Conductor 2651 is connected to the control grid 2609 through grid resistors 2613 and 2617.

The operation of the circuit disclosed in FIG. 26 is as follows: alternating current is impressed on conductors 2606 and 2607 and through these conductors on rectifiers 2621 and 2622 which, in turn, produce a potential across resistors 2623 and 2624, filtered by condenser 2630. This potential is impressed on potentiometers 2632 through 2639 and through commutator 2650 on a control grid 2609 of thyratron 2608. The magnitude of the control potential impressed on grid 2609 depends upon the setting and selection of any given potentiometer at any given instant by commutator 2650, the resistance of the potentiometers 2630–2639 and of the potentiometer arm 2640–2649 settings differing from each other. This control potential impressed on the control grid 2609 by rectifiers 2621–2622 and potentiometers 2630–2639 is opposed by the reference potential also impressed on the grid by the tachometer generator 2612. The voltage impressed by the tachometer generator across resistor 2613 is continuously proportional to the speed of rotation of the eddy current motor element 2603, the tachometer generator 2612 being mounted on shaft 2604 of the eddy current motor. Thyratron 2608, therefore, is made conductive at different portions, or phases, of that half cycle which makes the plate of thyratron 2608 positive. Therefore, the average magnitude of the pulsating current flowing through the cathode-anode circuit of thyratron 2608 corresponds to the magnitude of the positive potential impressed on grid 2609, the higher the grid potential the larger being the current flowing through the circuit.

The modification of this circuit from its known version disclosed in U.S. Patent No. 2,659,832 to R. L. Jaeschke, mentioned previously, and its adaptation to the present ball winding machine, resides in the introduction of the potentiometers 2630–2639 and commutator 2650, driven by shaft 36 which constantly varies the potential impressed on the control grid 2609 so as to produce variable speed oscillation of the yoke members 37a and 37b.

Figure 19:
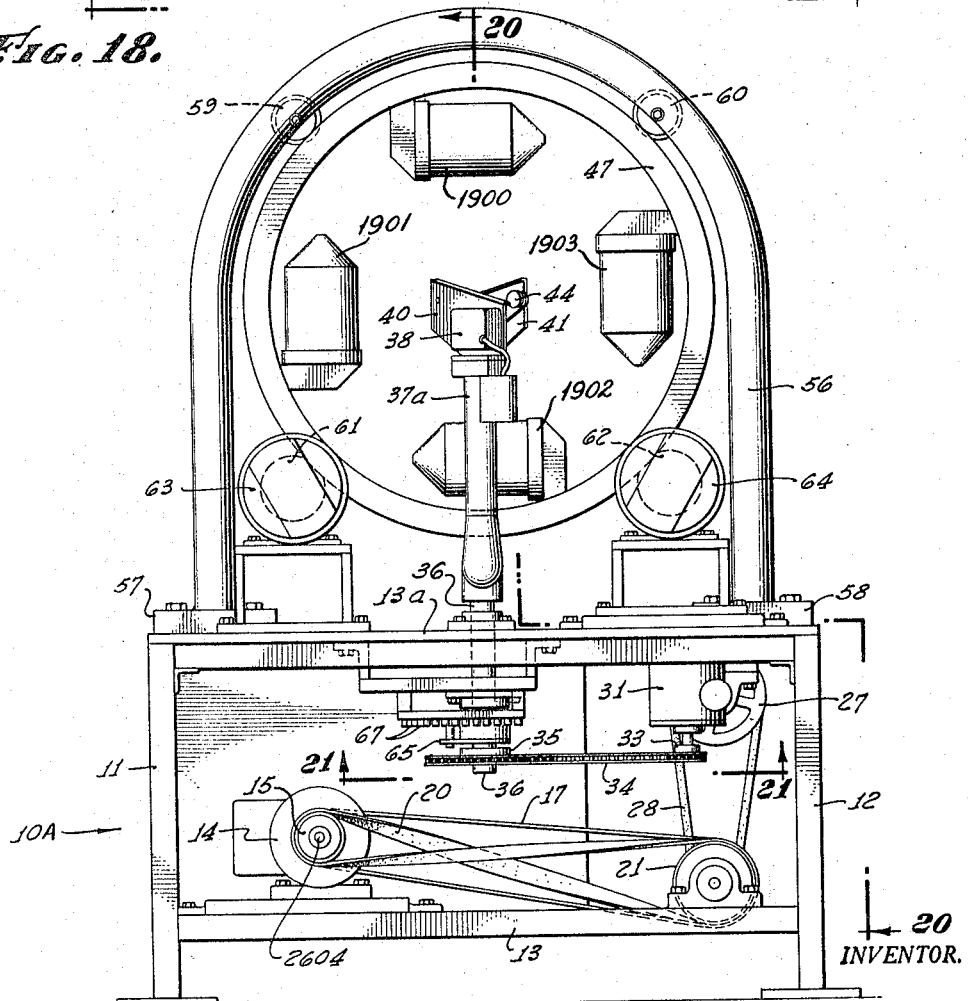
FIGURE 19 is a front view of the machine, taken along line 19—19, shown in FIGURE 18.

From the description of the machine it follows that rotation of the football around the major axis by the two synchronous motors 38 and 39 and the simultaneous rotation of four thread-guiding eyelets 2500 (these eyelets are not shown in other figures) and of four bobbins 1900–1903, FIG. 19, produces a substantially geodesic path followed by the four threads wound simultaneously on the ball. Since $W_1$ and $W_2$ are constant, the periods of all individual winding cycles remain also constant irrespective of the amplitude of the path followed by the thread during any cycle. The amplitude of the path is varied by oscillating yoke 37a–37b back and forth at a variable speed so as to deposit more turns toward the tips of the football and less turns around the center and the plane defined by the minor axes.

Referring now to FIGS. 27–31, they disclose more in detail the type of machine diagrammatically illustrated in FIG. 12. Football 2700 is mounted on two rotatable supports 2701 and 2702 which are mounted on two respective countershafts 2703 and 2704 mounted in bearings 2705 and 2706. Countershaft 2703 is connected to a gear box 2707 which in turn is connected to a synchronous motor 2708 through a countershaft 2709. Motor 2708, therefore, rotates football 2700 at constant angular velocity. Also mounted on countershaft 2703 is a pulley 2710 which is connected by means of a belt 2711 to a pulley 2712. Pulley 2712 is mounted on a shaft 2713 which is supported on the frame of the machine 2714. A sprocket wheel 2715 is mounted on shaft 2713 and a chain 2716 interconnects sprocket wheel 2715 with a sprocket wheel 2717. Sprocket wheel 2717 is mounted on a countershaft 2718 and drives a gear box 2719 which has a countershaft 2720 connected to a cam 2721. The cam 2721 includes a pin 2722 connected to a forked end 2723 of an oscillating arm 2724 which is pivoted around a pivot 2725. The other end 2727 of arm 2724 is provided with a slot 2726. Pin 2728 fits into slot 2726 and forms a sliding engagement with the slot. Pin 2728 is connected to a sprocket chain 2729 which fits into and forms a sliding engagement with a stationary guide arm 2730 mounted on frame 2714. The opposite end of chain 2729 is connected to a pin 2731 and a slide block 2732 which slide back and forth in oscilating arm 2733. Arm 2733 is provided with a slot 2734 for permitting pin 2731 to travel along slot 2734 in the manner which will be described later.

Crank 2755 is provided with a pin 2735 which is connected to a crank arm 2736. Pin 2737 interconnects two crank arms 2736 and 2733 and is pivoted on a stationary pivot 2740 mounted on a bracket 2739, bracket 2739 being mounted on frame 2714. Arm 2733 is rigidly connected to a pivot 2740 and it revolves around pivot 2740. As mentioned previously, pivot 2740 is rotatably mounted on frame 2714 by means of bracket 2739. Arm 2738 is provided with a member 2742 which is an integral part of oscillating arm 2733 and is welded to arm 2733.

Pin 2731 also forms a sliding engagement with a slot 2743 of an oscillating arm 2744 which is pivoted around a pivot 2745. Pivot 2745 is fixed to frame 2714 by means of a bracket 2746 mounted on frame 2714. Arm 2744 is provided with three eyelets 2747, 2748 and 2749, FIG. 28, which are used for guiding a cord 2750 from a bobbin 2751 mounted on a pin 2752. Thread 2750 leaves bobbin 2751 and then is threaded through eyelets 2749, 2748 and 2747, whereupon it is wound on football 2700 in the manner described previously.

The operation of the machine in FIGS. 27–31 is as follows:

Synchronous motor 2708 rotates football 2700 at a uniform angular velocity by means of countershafts 2703 and 2704. Cord 2750 is threaded through eyelets 2749, 2748 and 2747 and then several turns of this cord are manually wound on the football bladder 2700 so as to fasten the cord to the surface of the football. Synchronous motor 2708 is then started which begins the rotation of bladder 2700 around countershafts 2703 and 2704, and at the same time, synchronous motor 2708 produces a variable amplitude oscillation of the pivot arm 2744 in a direction indicated by a double arrow 2754 in FIG. 27. This variable amplitude oscillation is obtained as follows:

The V-belt drive 2710, 2711, 2712 produces the rotation of cam 2755, and sprocket wheeel 2715. Cam 2755 oscillates crank arms 2736 and 2733 and the pivot arm 2744 which produces the back and forth oscillation of pivot arm 2744 in the two directions indicated by the double arrow 2754. It is necessary now also to produce a variation in the amplitude of this oscillation of the pivot arm 2744, and this variation in the amplitude of the oscillation is obtained by means of a chain drive 2715, 2716, 2717, a cam 2721, pin 2722, variable velocity oscillating arm 2724, its slot 2726, chain 2729, pin 2731 and the sliding engagement between the pin 2731 and slot 2743 in the oscillating arm 2744. As cam 2721 rotates at a uniform angular velocity around countershaft 2720, it oscillates arm 2724 at a variable velocity which is a reasonable approximation of a sinusoidal wave form because of the slot-and-pin engagement 2722–2723 between cam 2721 and arm 2724. This substantially sinusoidal variable velocity oscillation of arm 2724 moves back and forth chain 2729 in the slot 2734 in arm 2733, and the slot of the stationary arm 2730, and slot 2726 in the oscillating arm 2724. The back and forth movement and oscillation of chain 2729 also moves back and forth and oscillates pin 2731 in slot 2743 of the oscillating arm 2744, and this back and forth movement of pin 2731 varies the amplitude of the oscillation of arm 2744.

One of the limitations of the machine described in FIGS. 27–31 resides in the fact that as illustrated in the above figures, the rate of oscillation of the oscillating arm 2724 is fixed by the mechanical linkages and the ratio of the gears in the gear boxes and pulley ratios that are provided between motor 2708 and arm 2724. An additional version of this machine which can have the same flexibility and range of adjustment that is present in the machine illustrated in FIGS. 18–26 would reside in connecting motor 14 and its shaft 2604, to shaft 2718, which is the shaft connected to the gears located in the gear box 2719, and eliminating sprocket wheel 2715, chain 2716 and sprocket wheel 2717. Additionally, in the above arrangement, gear box 2719 and its gears and the outgoing countershaft 2720 and crank arm 2721 with pin 2722 become driven by motor 14 with the result that the distribution of the turns around the girth of the football and its poles may have as wide a range of adjustment as in the case of the machine illustrated in FIGS. 18–26.

In this version of the machine the commutator arm 65 is connected to the arm 2738–2733 and is oscillated by this arm. Box 2100 now is supported by a frame 3200 of the machine, and its position on the frame is adjusted by means of slots 3201 and 3202 for obtaining proper synchronization or co-phasing of the working cycle of motor 14 with motor 2708.

Before concluding the description of the machine illustrated in FIGS. 27–31, it should be stated in conclusion that the maximum total amplitude of the oscillating arm 2744 is in the order of 110–116°, or ±55°–±58°, the minimum amplitude being in the order of 10°, or ±5°, with the arm being +5° to the left of the equator at one instance, and −5° to the right of the equator during the two extreme limits of the oscillation of arm 2744 when it is closest to the equator, i.e., the plane bisecting the football and passing through the intersection of the major and the minor axes of the football.

It should be also noted here that in order to produce classical geodesic curves, the oscillation of arm 2744 should be at a variable rather than a constant rate so as to produce one complete oscillation of arm 2744, i.e., from its position at, say +5°, its travel from +5° to −5° and then its return back to its original position of +5° (plus an additional increment in degrees that takes place during each cycle) during from .45 to .51 of the revolution of the football around its major axis, and its maximum amplitude of ±55–±58° during from .83 to .78 of the revolution of the football around its major axis. The complete oscillation of arm 2744 is considered to be, when it swings from, say +56° to −56° and back again to approximately +54°–+53°, the increment in degrees which takes place from one cycle to the next cycle being in the order of, say 2–5°. Accordingly, arm 2744, either in the disclosed version of FIGS. 27–31 or its modified version, travels much faster when it makes its maximum amplitude because it must cover this maximum amplitude of 110–116° in only a slightly longer time (.83 to .78 vs. .51 to .45). Correspondingly, arm 2744 travels much slower, in either version, when it is closest to the equator.

In order to comply with the above theoretical requirements for the classical geodesic curves, i.e., .81–.78 of the revolution of the ball around the major axis for the maximum amplitude of arm 2744 and .51–.45 for the minimum amplitude of arm 2744, it would be also necessary to provide a separate variable speed drive for crank 2755 and countershaft 2713. In this version of the machine there are then three separate motors: synchronous motor 2708, and two separate, independently controlled variable speed motors for oscillating arms 2736 and 2724 respectively at two respective variable rates of oscillation. Such machine would then produce classical geodesic curves and any desired cord distribution, or distribution of turns, over the surface of the prolate spheroid.

In order to obtain the same variations in the time it takes to produce maximum and minimum amplitude turns (±56° vs. ±5°) with the machine illustrated in FIGS. 18–23, it is also necessary to replace the two synchronous motors 63 and 64 with two variable speed motors which may be of the type as motor 14. In such a case two variable speed control systems of the type shown in FIG. 26 would be used.

The reasons for having more turns in the vicinity of the two poles is that the bladder has a tendency to stretch in the direction of the major axis rather than the minor axis.

Satisfactory and very close approximations of the geodesic paths nevertheless, are obtainable with the machines shown in FIGS. 18–26 and 27–31 even without the above refinements.

What I claim as new is:

1. A method for reinforcing a wall of a hollow spheroid subjected to pressure of compressed fluid within said spheroid when said spheroid is in use, said spheroid having a major axis passing through poles at the opposite ends of the spheroid and a minor axis perpendicular to the major axis midway between the poles of the spheroid, and having an equator in an equatorial plane perpendicular to the major axis and in which the minor axis lies, said method including the steps of
    (a) providing an inflated spheroid,
    (b) providing a source of said cord and eyelet for guiding and winding said cord on said wall,
    (c) attaching the free end of said cord to said spheroid,
    (d) thereafter rotating said spheroid around the major axis of said spheroid to wind said cord around said spheroid,
    (e) oscillating at a variable amplitude said eyelet back and forth across the equatorial plane of said spheroid,
    (f) correlating the speed of rotation of said spheroid around said major axis and the rate of oscillation of said eyelet to make all of the turns of said cord follow a series of geodesic paths merging into each other on the surface of said spheroid to make all of said turns capable to counteract said pressure,
    (g) varying the amplitude of said oscillations between a minimum amplitude producing a plurality of substantially geodesic turns in the vicinity of the equator of said spheroid and a maximum amplitude producing a plurality of substantially geodesic turns running substantially from tip to tip of said spheroid to cover the surface of said spheroid with said cord,
    (h) and controlling the number of oscillations of said eyelet at any given amplitude to produce that type of distribution of the turns over the surface of said spheroid which is capable of resisting effectively all the stresses imposed on said spheroidal wall by said fluid.

2. A method of applying a cord winding to a prolate spheroid which includes the steps of
    (a) continuously rotating said spheroid at a uniform angular velocity $W_1$ around its major axis,
    (b) continuously oscillating said major axis in a first plane and around an oscillatory axis passing through the center of said spheroid and perpendicular to said first plane at a continuously variable angular rate back and forth through an angle less than 180°,
    (c) rotating said source and said eyelet around a spheroid in a second plane perpendicular to the first plane at a constant angular velocity $W_2$ for applying a plurality of turns of said cord on said spheroid,
    (d) and relating the magnitudes of said $W_1$ and $W_2$ to make said cord follow a substantially geodesic path over the surface of said spheroid.

3. A method of winding a cord from a source of cord with the aid of an eyelet guiding said cord onto a surface of a prolate spheroid having two poles, a major axis passing through said poles and two polar regions immediately surrounding said poles, and an axis of oscillation passing thorugh the center of said spheroid and being perpendicular to said major axis, said method including the steps of
    (a) attaching said cord to said spheroid while said spheroid is stationary,
    (b) rotating said spheroid thereafter around the major axis at a uniform angular velocity,
    (c) simultaneously oscillating said spheroid around said axis of oscillation,
    (d) at a constant frequency,
    (e) variable amplitude,
    (f) constant maximum and minimum amplitudes and (g) a continuously varying velocity, (h) and rotating said source and said eyelet at a uniform angular velocity along a circular path lying in a single plane, (i) the center of said path coinciding with the center of said spheroid, (j) and controlling the amplitude of said oscillating to deposit a non-uniform layer of said cord over the surface of said spheroid.

4. A method of applying a reinforcing cord winding to the outer surface of the wall of a hollow spheroid having a major axis passing through poles at the opposite ends of the spheroid and a minor axis perpendicular to the major axis midway between the poles of the spheroid, and having an equator in an equatorial plane perpendicular to the major axis and in which the minor axis lies with the aid of a source of said cord and an eyelet guiding said cord onto the surface of said spheroid to make a reinforcing winding resisting outward pressure of a compressed fluid normally within said spheroid, said method including the steps of:

(a) passing the free end of said cord through said eyelet and then fastening said end to said spheroid;

(b) thereafter rotating said spheroid around its major axis, (c) simultaneously producing continuous variable oscillations of said eyelet relative to and symmetrical with respect to the equator and substantially in the direction of the major axis of said spheroid to wind a plurality of variable amplitude turns of said cord over the surface of said spheroid, (d) timing the periods of said oscillations and the speed of rotation of said spheroid around said major axis so as to continuously distribute said cord in a series of substantially geodesic curves over the surface of said spheroid, said curves being symmetrical with respect to said equator and comprising substantially three consecutive turns of said cord around said spheroid as viewed in the equatorial plane, said three consecutive turns constituting a single winding cycle returning the cord to substantially the same point on the equator of said spheroid except for the advancement of said cord by a predetermined angle around said equator;

(e) making the minimum amplitude of oscillations such as to wind a plurality of turns in the equatorial region of said spheroid including turns crossing back and forth said equator, and (f) making the maximum amplitude of said oscillations over two polar areas adjacent the poles of said spheroid and running from polar area to polar area and over the equator of said spheroid.

5. A method of applying a reinforcing cord winding to the outer surface of the wall of a hollow spheroid having a major axis passing through poles at the opposite ends of the spheroid and a minor axis perpendicular to the major axis midway between the poles of the spheroid, and having an equator in an equatorial plane perpendicular to the major axis and in which the minor axis lies with the aid of a source of said cord and an eyelet guiding said cord onto the surface of said spheroid to make a reinforcing winding resisting outward pressure of a compressed fluid normally within said spheroid, said method including the steps of:

(a) passing the free end of said cord through said eyelet and then fastening said end to said spheroid;

(b) thereafter rotating said spheroid around its major axis, (c) rotating said source and said eyelet in a single plane around a circular path to produce continuous variable amplitude oscillations of said eyelet relative to and symmetrical with respect to the equator and substantially in the direction of the major axis of said spheroid to wind a plurality of variable amplitude turns of said cord over the surface of said spheroid, (d) timing the periods of said oscillations and the speed of rotation of said spheroid around said major axis so as to continuously distribute said cord in a series of substantially geodesic curves over the surface of said spheroid, said curves being symmetrical with respect to said equator and comprising substantially three consecutive turns of said cord around said spheroid as viewed in the equatorial plane, said three consecutive turns constituting a single winding cycle returning the cord to substantially the same point on the equator of said spheroid except for the advancement of said cord by a predetermined angle around said equator, (e) making the minimum amplitude of oscillations such as to wind a plurality of turns in the equatorial region of said spheroid including turns crossing back and forth said equator, and (f) making the maximum amplitude of said oscillations over two polar areas adjacent the poles of said spheroid and running from polar area to polar area and over the equator of said spheroid.

References Cited by the Examiner

UNITED STATES PATENTS

| | | | |
|---|---|---|---|
| 1,974,508 | 9/1934 | Pym | 156—161 |
| 2,061,604 | 11/1936 | Winterbauer | 273—65.5 |
| 2,138,452 | 11/1938 | Honig | 242—3 |
| 2,153,408 | 4/1939 | Bogoslowski | 156—70 |
| 2,224,416 | 12/1940 | Voit et al. | 242—3 |
| 2,231,092 | 2/1941 | Schenck | 242—2 |
| 2,305,409 | 12/1942 | Crowley | 273—65.5 |
| 2,352,872 | 7/1944 | Voit et al. | 273—65.5 |
| 2,518,967 | 8/1950 | Witt | 156—397 |
| 2,607,540 | 8/1952 | Rekette | 242—3 |
| 2,634,916 | 4/1953 | Taylor | 242—2 |
| 2,634,922 | 4/1953 | Taylor | 242—163 |
| 2,634,923 | 4/1953 | Taylor | 242—163 |
| 2,688,488 | 9/1954 | Crowley | 273—65.5 |
| 2,763,052 | 9/1956 | Elmer | 29—155.5 |
| 2,843,153 | 7/1958 | Young | 156—175 X |
| 2,855,158 | 10/1958 | Pumphrey et al. | 242—2 |
| 2,858,992 | 11/1958 | Wentz | 242—2 |
| 2,901,190 | 8/1959 | Wentz | 242—2 |
| 2,966,935 | 1/1961 | Wiltshire | 156—433 |
| 3,047,191 | 6/1962 | Young | 156—175 |

FRANK J. COHEN, *Primary Examiner.*

LEYLAND M. MARTIN, MERVIN STEIN, *Examiners.*

B. S. TAYLOR, *Assistant Examiner.*